(12) United States Patent
Szoellosi et al.

(10) Patent No.: US 12,358,556 B2
(45) Date of Patent: Jul. 15, 2025

(54) METHOD FOR ESTIMATING AN ARTICULATION ANGLE BETWEEN A TOWING VEHICLE AND A TRAILER, RESPECTIVE DEVICE, DRIVING ASSISTANCE SYSTEM, COMMERCIAL VEHICLE AND COMPUTER PROGRAM PRODUCT

(71) Applicant: KNORR-BREMSE Systeme fuer Nutzfahrzeuge GmbH, Munich (DE)

(72) Inventors: Adam Szoellosi, Budapest (HU); Andras Batai, Pecs (HU); Daniel Thum, Munich (DE); Huba Nemeth, Budapest (HU); Tamas Komlos, Csavoly (HU); Tamas Szokol, Budapest (HU); Valer Merza, Szentendre (HU); Valter Zoeldhegy, Diosd (HU); Zsolt Dudas, Szeged (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 204 days.

(21) Appl. No.: 18/128,513

(22) Filed: Mar. 30, 2023

(65) Prior Publication Data
US 2023/0311987 A1 Oct. 5, 2023

(30) Foreign Application Priority Data
Mar. 31, 2022 (EP) .................................... 22165932

(51) Int. Cl.
*B62D 15/02* (2006.01)
*B62D 13/00* (2006.01)

(52) U.S. Cl.
CPC .......... *B62D 15/024* (2013.01); *B62D 13/00* (2013.01)

(58) Field of Classification Search
CPC . B60D 1/24; B60D 1/246; B60D 1/30; B60D 1/58; B62D 11/00; B62D 11/10;
(Continued)

(56) References Cited

U.S. PATENT DOCUMENTS

| 10,173,722 B2* | 1/2019 | Pourrezaei Khaligh ..................... B60D 1/62 |
| 11,964,659 B2* | 4/2024 | Pourrezaei Khaligh ..................... B60K 35/28 |

(Continued)

OTHER PUBLICATIONS

Extended European Search Report issued in European Application No. 22165932.9 dated Sep. 22, 2022 (11 pages).

*Primary Examiner* — Logan M Kraft
*Assistant Examiner* — Johnny H Hoang
(74) *Attorney, Agent, or Firm* — Crowell & Moring LLP

(57) ABSTRACT

A method estimates an articulation angle between a towing vehicle and a trailer with respect to a pivot. The method determines a distance between an instantaneous center of velocity of the towing vehicle and a center of at least one axle of the towing vehicle representative for a rotation of the towing vehicle about the instantaneous center of velocity of the towing vehicle and/or a distance between an instantaneous center of velocity of the trailer and a center of at least one axle of the trailer representative for a rotation of the trailer about the instantaneous center of velocity of the trailer. The method determines at least one instantaneous speed representative for a wheel speed of at least one wheel of the towing vehicle and/or the trailer, wherein the at least one instantaneous speed refers to the at least one determined distance, and estimates the articulation angle based on the at least one determined instantaneous speed and the at least one determined distance.

15 Claims, 3 Drawing Sheets

(58) Field of Classification Search
CPC ...... B62D 13/00; B62D 13/005; B62D 13/04; B62D 15/023; B62D 15/024; B62D 53/06; B62D 53/08; B62D 59/00; G05D 1/0212
See application file for complete search history.

(56) References Cited

U.S. PATENT DOCUMENTS

| | | |
|---|---|---|
| 2016/0139599 A1 | 5/2016 | Czlapinski et al. |
| 2018/0001928 A1* | 1/2018 | Lavoie ................. B62D 15/021 |
| 2019/0233034 A1* | 8/2019 | Viele ........................ B60D 1/36 |
| 2022/0144028 A1* | 5/2022 | Saini ........................ B60D 1/62 |
| 2022/0355860 A1* | 11/2022 | Rydström .............. B62D 13/06 |
| 2023/0080456 A1* | 3/2023 | Fröjd .................... B62D 53/06 280/419 |

* cited by examiner

METHOD FOR ESTIMATING AN ARTICULATION ANGLE BETWEEN A TOWING VEHICLE AND A TRAILER, RESPECTIVE DEVICE, DRIVING ASSISTANCE SYSTEM, COMMERCIAL VEHICLE AND COMPUTER PROGRAM PRODUCT

CROSS REFERENCE TO RELATED APPLICATION

This application claims priority under 35 U.S.C. § 119 from European Patent Application No. 22165932.9, filed Mar. 31, 2022, the entire disclosure of which is herein expressly incorporated by reference.

BACKGROUND AND SUMMARY

The present invention relates to a method for estimating an articulation angle between a towing vehicle and a trailer, a respective device for estimating the articulation angle, a driving assistance system for a towing vehicle comprising the device for estimating the articulation angle, a commercial vehicle comprising the device and/or the driving assistance system and a computer program product for executing the method.

The articulation angle of a trailer with respect to a towing vehicle is a very important signal for vehicle maneuver execution, especially for automated driving. The knowledge of the actual articulation angle is necessary to be able to calculate the trajectory of the vehicle, to control the movement and to make the transport safer.

The basic option to determine the articulation angle is by measuring using an articulation angle sensor. However, such sensor causes additional cost and might be error prone.

Therefore, it is an object of the present invention to provide an improved method, device, driving assistance system, commercial vehicle and computer program product to determine an articulation angle between a towing vehicle and a trailer.

The object is solved by the subject-matter of the independent claims. Further aspects of the present invention are subject to the dependent claims.

According to the present invention, a method for estimating an articulation angle between a towing vehicle and a trailer with respect to a pivot, comprises the steps of:
  determining a distance between an instantaneous center of velocity of the towing vehicle and a center of at least one axle of the towing vehicle representative for a rotation of the towing vehicle about the instantaneous center of velocity of the towing vehicle and/or a distance between an instantaneous center of velocity of the trailer and a center of at least one axle of the trailer representative for a rotation of the trailer about the instantaneous center of velocity of the trailer,
  determining at least one instantaneous speed representative for a wheel speed of at least one wheel of the towing vehicle and/or the trailer, wherein the at least one instantaneous speed refers to the at least one determined distance, and
  estimating the articulation angle based on the at least one determined instantaneous speed and the at least one determined distance.

With respect to the above the articulation angle is rather determined by an estimation of the articulation angle based on wheel speeds than by a direct measurement of the articulation angle by an articulation angle sensor. Specifically, wheel speeds of representatives thereof may be determined by already implemented sensors. For example, wheel speed sensors implemented with respect to a brake control or the like may be used to provide data for an estimation of the articulation angle. In other words, articulation angle sensors for a direct measurement may be omitted. However, articulation sensors may still be used in parallel, e.g. for calibration purposes and/or plausibility checks.

The towing vehicle may be a truck towing the trailer such as a semi-trailer or a central axis trailer. However, the towing vehicle may also be a towing trailer towing the trailer within a vehicle combination of a truck and several trailers. In such configuration the articulation angle between the truck towing the towing trailer and/or the articulation angle between the towing trailer and the trailer may be estimated. The articulation angle is estimated with respect to a pivot representative of the relative rotational movement between the towing vehicle and the trailer, e.g. a kingpin. If a steering angle is applied to a vehicle combination of at least one towing vehicle and at least one trailer, any of the towing vehicle and trailer represents a rotating rigid body having a point as so-called "Instantaneous Center of Velocity", hereinafter also referred to as "ICV". Each of the rigid bodies rotates around its respective ICV. Accordingly, when a vehicle, i.e. the towing vehicle and/or the trailer, turns, e.g. in response to a steering angle, it turns around its ICV at such moment in time. The ICV of the towing vehicle is different from the ICV of the trailer. Further, the distance between the respective ICV and a respective wheel of the vehicle is proportional to the magnitude of the wheel speed. Consequently, if the wheel speeds of a vehicle are known, the ICV associated with the vehicle can be determined to deduce the amount of cornering to estimate the articulation angle between the towing vehicle and the trailer. In other words, the estimation of the articulation angle between the towing vehicle and the trailer with respect to the pivot is based on the wheel speed(s) of the towing vehicle and/or the trailer as time varying signals.

In some embodiments, the at least one instantaneous speed is determined for at least one non-steered axle of the towing vehicle, preferably as speed of the center of at least one rear axle of the towing vehicle, and/or for at least one non-steered axle of the trailer, preferably as speed of the center of at least one rear axle or as speed of at least one wheel of at least one rear axle of the trailer.

In other words, the estimation of the articulation angle between the towing vehicle and the trailer with respect to the pivot is based on the wheel speed(s) of the towing vehicle on the non-steered axle(s) and/or the wheel speed(s) of the trailer on the non-steered axle(s), e.g. non dolly axles.

In some embodiments, the distance between the instantaneous center of velocity of the towing vehicle and the center of at least one axle of the towing vehicle is calculated, preferably based on a distance between a steering axle, preferably a front axle, of the towing vehicle, and a non-steering axle, preferably a rear axle, of the towing vehicle, and a steering angle of the steering axle.

Accordingly, the determination of the distance between the instantaneous center of velocity of the towing vehicle and the center of at least one axle of the towing vehicle is determined by being calculated. Alternatively, the distance between the instantaneous center of velocity of the towing vehicle and the center of at least one axle of the towing vehicle may be stored in a database in dependence of a steering angle.

Specifically, the distance between the instantaneous center of velocity of the towing vehicle and the center of at least one axle of the towing vehicle may be calculated based on a distance between a steering axle, such as a front axle, of the towing vehicle and a non-steering axle, such as a rear axle, of the towing vehicle, and a steering angle of the steering axle. The distance between the steering axle and the non-steering axle of the towing vehicle may be input data or data provided by a database as available geometric input data of the towing vehicle. The steering angle may be provided by a direct or indirect determination, e.g. to be measured by a sensor or as per a steering command by an automatic driving system. Consequently, the estimation of the articulation angle between the towing vehicle and the trailer with respect to the pivot is based on the wheel speed(s) of the towing vehicle and/or the trailer and the steering angle of the steering axle as time varying signals.

Preferably, the distance between the instantaneous center of velocity of the towing vehicle and the center of at least one axle of the towing vehicle is calculated by:

$$r = b/\tan(\vartheta) \quad \text{(equation (1))},$$

wherein r is the distance between the instantaneous center of velocity of the towing vehicle and the center of at least one axle of the towing vehicle, b is the distance between the steering axle of the towing vehicle and the non-steering axle of the towing vehicle, and is the steering angle.

Accordingly, the estimation of the articulation angle may be based on the steering angle in accordance with a steering action. The steering angle refers to the steering action on the steering axle, e.g. the front axle or at least one of the front axles of the towing vehicle.

In some embodiments, the distance between the instantaneous center of velocity of the trailer and the center of at least one axle of the trailer is calculated, preferably based on a distance between a center of at least one wheel on the at least one axle of the trailer facing towards the instantaneous center of velocity of the trailer and a distance between the center of the at least one wheel on the at least one axle facing towards the instantaneous center of velocity of the trailer and at least one wheel on the other side of the at least one axle.

Preferably, the distance between the instantaneous center of velocity of the trailer and the center of at least one axle of the trailer is calculated by:

$$r_T = r_0 + w/2 \quad \text{(equation (2))},$$

wherein $r_0$ is preferably defined by $$r_0 = w \cdot \frac{\min(v_{TL}, v_{TR})}{abs(v_{TL} - v_{TR})}, \quad \text{(equation (3))}$$

wherein $v_{TL}$ is the speed of wheel(s) of the at least one axle facing towards the instantaneous center of velocity of the trailer and $v_{TR}$ is the speed of wheel(s) of at least one axle facing away from the instantaneous center of velocity of the trailer.

In other words, the estimation of the articulation angle may be based on the wheel speed(s) of the trailer on both sides on the same axis.

In some embodiments, the method further comprises a determination of an angle of a velocity vector of the pivot and the velocity vector of the at least one axle of the towing vehicle, preferably calculated by:

$$\varepsilon = \tan^{-1}\left(\frac{c}{r}\right), \quad \text{(equation (4))}$$

wherein c is defined as distance between the center of at least one axle of the towing vehicle and the pivot.

Accordingly, the angle of a velocity vector of the pivot and the velocity vector of the at least one axle of the towing vehicle may be calculated based geometric data of the towing vehicle, i.e. the distance between the center of at least one axle of the towing vehicle and the pivot, and the distance between the instantaneous center of velocity of the towing vehicle and the center of at least one axle of the towing vehicle, which may be also calculated based on geometric data, i.e. the distance between the steering axle of the towing vehicle and the non-steering axle of the towing vehicle, and the steering angle.

Preferably, the articulation angle is estimated by:

$$\phi = \cos^{-1}\left(\frac{v_T}{v_K}\right) - \varepsilon, \quad \text{(equation (5))}$$

wherein $v_T$ is defined as speed of the center of at least one axle of the trailer, $v_K$ is defined as speed of the center of the pivot, preferably calculated by:

$$v_K = v_R/\cos(\varepsilon) \quad \text{(equation (6))},$$

and the ratio between the speeds of the center of the at least one rear axle of the trailer and the center of the pivot is expressed by:

$$\frac{v_T}{v_K} = \cos(\varepsilon + \varphi), \quad \text{(equation (7))}$$

According to equation (5), the articulation angle may be estimated in dependence of the angle of a velocity vector of the pivot and the velocity vector of the at least one axle of the towing vehicle, which may be calculated based on equation (4), and the ratio between the speeds of the center of the at least one rear axle of the trailer and the center of the pivot as per equation (7). Consequently, the estimation of the articulation angle may only depend on the geometric data of the towing vehicle, e.g. the distance between the front and the rear axle and the distance between the rear axle and the pivot, the instantaneous steering angle and the respective wheel speeds of the center of rear axles of the towing vehicle and the center of rear axles of the trailer.

Alternatively, the articulation angle is estimated by:

$$\varphi = \tan^{-1}\left(\frac{L}{r_T}\right) - \varepsilon, \quad \text{(equation (8))}$$

wherein L is defined as distance between the at least one axle of the trailer and the pivot.

Here, the term $$\cos^{-1}\left(\frac{v_T}{v_K}\right)$$

is replaced by $$\tan^{-1}\left(\frac{L}{r_T}\right),$$

which allows the articulation angle to be estimated based on the geometric data of the trailer, e.g. the distance between the pivot and the rear axle of the trailer and the distance between the left and right wheels of the rear axle of the trailer, the instantaneous steering angle and the respective wheel speeds of the left and the right wheel of the trailer.

The method for estimation the articulation angle may also comprise the estimation of the articulation angle as per equation (7) and equation (8) in parallel, for example, for a plausibility check and/or to proceed further with the estimated articulation angle indicated a higher risk under given driving conditions. Accordingly, the security lever may be enhanced and/or failures of the wheel speed sensors may be detected.

In some embodiments, the articulation angle is estimated by:

$$\varphi = \tan^{-1}\left(\frac{L}{r_T}\right), \quad \text{(equation (9))}$$

wherein L is defined as distance between the at least one axle of the trailer and the pivot.

Equation (9) is a simplification of equation (8) with c being set to ε=0 as to be neglected. By such approach, the articulation angle can be estimated without any data of the towing vehicle, i.e. geometric data, wheel speeds or the steering angle of the towing vehicle. The simplification may only be applied under predetermined operating conditions of the towing vehicle and trailer combination, e.g. in dependence of a driving speed, road conditions and/or steering angle. Further, as per the above, the estimation as per equation (9) may also be used in parallel to the estimation as per equation (7) and/or equation (8). In principle, any estimation of the articulation angle by at least two of the equations (7) to (9) may only be performed at predetermined timings, for example, in dependence of predetermined operating conditions, regular intervals as interim checks or the like.

In another aspect, the present invention relates to a device for estimating an articulation angle between a towing vehicle and a trailer with respect to a pivot by executing the method as described above. The device comprises a data unit configured to receive and/or store data of the distance between the steering axle, preferably a front axle, of the towing vehicle and a non-steering axle, preferably a rear axle, of the towing vehicle, the distance between the non-steering axle of the towing vehicle and the pivot, the distance between the at least one axle of the trailer and the pivot, and/or the distance between the center of the at least one wheel on the at least one axle facing towards the instantaneous center of velocity of the trailer and at least one wheel on the other side of the at least one axle. The device further comprises a determination unit configured to determine the steering angle of the steering axle, the speed of the center of at least one axle of the towing vehicle, the speed of the center of at least one axle of the trailer, and/or the speed of at least one wheel of at least one rear axle of the trailer, preferably the speeds of opposing wheels of the at least one axle with respect to the center of the at least one axle. Additionally, the device comprises an estimation unit configured to determine the distance between the instantaneous center of velocity of the towing vehicle and the center of at least one axle of the towing vehicle representative for a rotation of the towing vehicle about the instantaneous center of velocity of the towing vehicle, the distance between the instantaneous center of velocity of the trailer and the center of at least one axle of the trailer representative for a rotation of the trailer about the instantaneous center of velocity of the trailer, the speed of the center of the pivot, the angle of the velocity vector of the pivot and the velocity vector of the at least one axle of the towing vehicle, and/or the ratio between the speeds of the center of the at least one rear axle of the trailer and the center of the pivot to estimate the articulation angle, and an output unit configured to output the articulation angle.

For example, the data unit is configured to receive and/or store the geometric data of the towing vehicle and/or the trailer required to estimate the articulation angle as per equation (7), equation (8) and/or equation (9). Similarly, the determination unit is configured to determine the steering angle and/or the respective wheel speeds required to estimate the articulation angle as per equation (7), equation (8) and/or equation (9). Accordingly, the determination unit receives respective wheel speed sensor signals or comprises such sensors. The estimation unit is configured to receive the required data by the data unit and the determination unit to determine the variables required to estimate the articulation angle as per equation (7), equation (8) and/or equation (9) based on the data of the data unit and the determination unit to estimate the articulation angle. The output unit may be configured to output the estimated articulation angle for further processing by a driving assistance system to take measures in response to the estimated articulation angle, e.g. to avoid critical articulation angles. Alternatively or in addition, the output device may be configured to provide an optical, acoustic and/or tactile output representative of the estimated articulation angle. As an example, the estimated articulation angle may be displayed to an operator of the towing vehicle.

Any kind of output by the output device may depend on the instantaneous estimated articulation angle. For example, if the articulation angle is below a predetermined value, the estimated articulation angle is output to the driving assistance device to be considered for further assistance to the extent required. However, if the estimated articulation angle exceeds the predetermined value, the estimated articulated angle may also be displayed to an operator of the towing vehicle and/or a supervising control architecture. Upon further exceeding the predetermined value over a predetermined period in time and/or a critical value, an acoustic alarm and/or red light may be added. The predetermined and/or critical value may be adaptable to different driving operations and/or boundary conditions such as road conditions.

The data unit, the determination unit, the estimation unit and the output unit do not have to be separated entities but may only be represented as different operators of a processor or the like.

In some embodiments, the estimation unit is or comprises a calculation unit to calculate the at least one of:
the distance between the instantaneous center of velocity of the towing vehicle and the center of at least one axle of the towing vehicle representative for a rotation of the towing vehicle about the instantaneous center of velocity of the towing vehicle;

the distance between the instantaneous center of velocity of the trailer and the center of at least one axle of the trailer representative for a rotation of the trailer about the instantaneous center of velocity of the trailer;

the speed of the center of the pivot;

the angle of the velocity vector of the pivot and the velocity vector of the at least one axle of the towing vehicle; and/or the ratio between the speeds of the center of the at least one rear axle of the trailer and the center of the pivot.

Accordingly, the estimation unit is configured to calculate the required variables to estimate the articulation angle. Due to the calculation ability, the estimation unit may not require storage means for data basis to assign an estimated articulation angle to any parameter combination provided by the data unit and the determination unit but allows the use of an algorithm instead. However, the estimation unit may still use some stored articulation angles in response to a parameter combination provided by the data unit and the determination unit in addition, e.g. for plausibility checks and failure analysis, or alternatively, e.g. if available and otherwise to be calculated.

In another aspect, the present invention relates to a driving assistance system for a towing vehicle comprising the device for estimating an articulation angle between a towing vehicle and a trailer with respect to a pivot as described above by executing the method as described above.

By receiving the estimated articulation angle, the driving assistance system may be able to take respective countermeasures depending on the estimated articulation angle or ranges thereof. For example, the driving assistance system may be configured to restrict the speed, accelerations or decelerations and/or steering angles of the towing vehicle or may completely stop the towing vehicle. The consideration of the estimated articulation angle may be preferably advantageous in driving assistance systems for autonomous driving operations.

In another aspect, the present invention relates to a commercial vehicle comprising the device as described above and/or the driving assistance system as described above.

In another aspect, the present invention relates to a computer program product comprising a program code stored on a machine-readable medium for executing the method as described above.

The program code stored is preferably executed on a data processing unit of the device for estimating an articulation angle between a towing vehicle and a trailer with respect to a pivot as described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
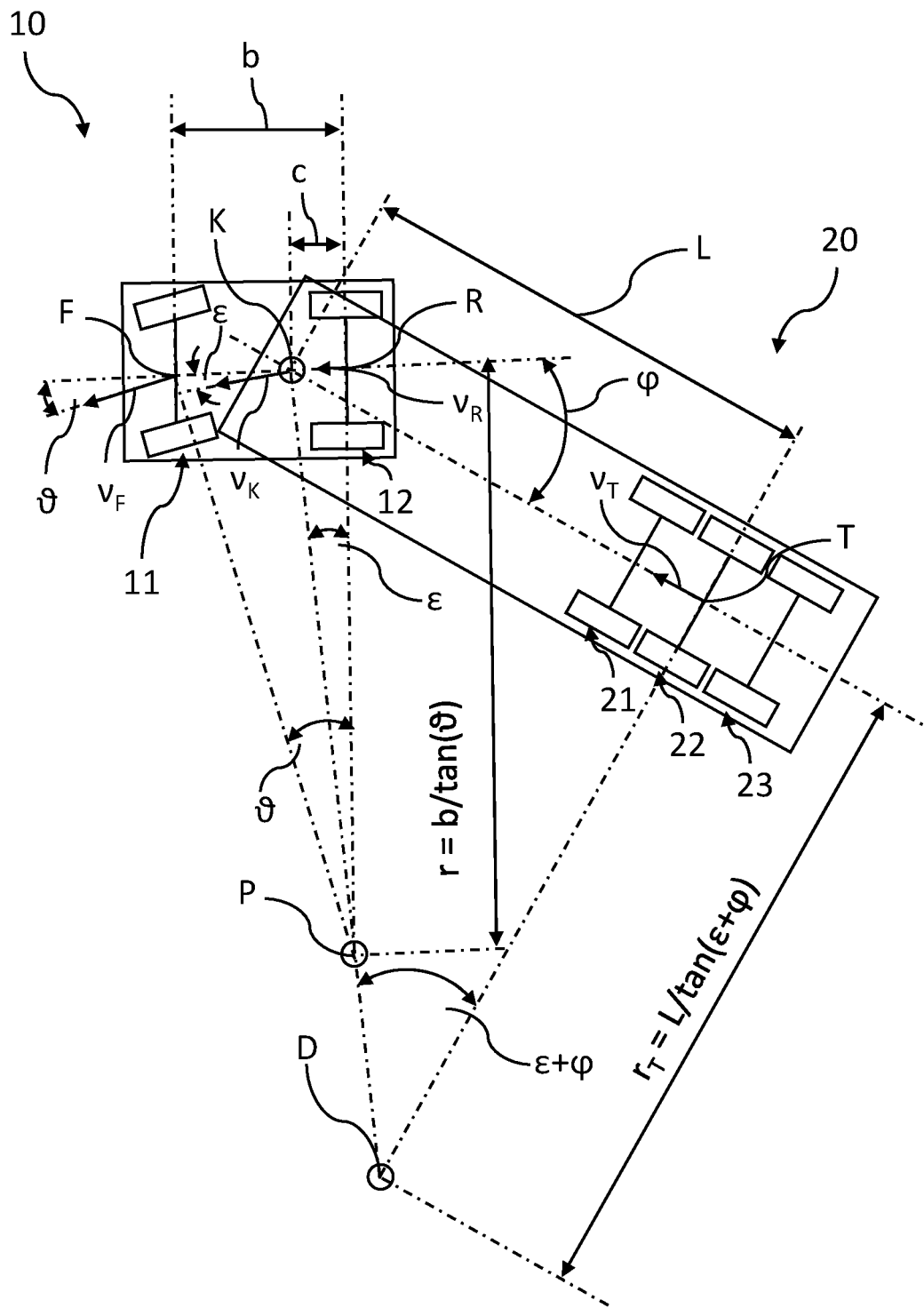
FIG. 1 is a top view on a towing vehicle and a trailer attached thereto showing different data applicable for an estimation of the articulation angle between the towing vehicle and the trailer with respect to a pivot.

FIG. 1 shows top view on a towing vehicle 10 and a trailer 20 attached thereto showing different data applicable for an estimation of the articulation angle $\varphi$ between the towing vehicle 10 and the trailer 20 with respect to a center of a king pin K as pivot.

The towing vehicle 10 comprises a front axle 11, which is the steering axle in the given exemplary embodiment, and a rear axle 12, which is the non-steering axle in the given exemplary embodiment. The center of the front axle 11 is denoted by F and the center of the rear axle 12 is denoted by R. Accordingly, a wheelbase as the distance b between the front axle 11 and the rear axle 12 is the distance between point F and point R. In accordance with a steering angle the direction of a vector of the speed $v_F$ of the center of the front axle 11 with respect to the point F corresponds to the steering angle of the wheels of the front axle 11 with respect to the longitudinal axis of the towing vehicle, which extends between point F and point R. Since the rear axle 12 is a non-steering axle, a vector of the speed $v_R$ of the center of the rear axle 12 with respect to the point R remains directed in the longitudinal direction of the towing vehicle 10.

The towing vehicle 10 comprises the king pin K about which the trailer 20 pivots in response to the instantaneous steering angle $\vartheta$ resulting in the articulation angle $\varphi$ between the longitudinal axis of the towing vehicle 10 and the longitudinal axis of the trailer 20, which extends between the king pin K and a center T of rear axles 21, 22, 23 of the trailer 20 to be described later. A vector of the speed $v_K$ of the center of the king pin K corresponds an angle $\varepsilon$. A distance c is the distance between the center of the kingpin K and point R in the longitudinal direction of the towing vehicle.

Upon application of the steering angle the towing vehicle 10 represents a rotating rigid body rotating about point P as instantaneous center of velocity (ICV) of the towing vehicle 10. A distance r as the distance between point P and point R can be expressed by:

$$r = b/\tan(\vartheta) \quad \text{(equation (1))}.$$

Accordingly, the instantaneous distance r can be determined based on the distance b between point F and point R as given input data and the instantaneous steering angle $\vartheta$.

The trailer 20 comprises a first rear axle 21, a second rear axle 22 and a third rear axle 23. The rear axles 21, 22 and 23 are represented by a point T as center of the rear axles 21, 22, 23 of the trailer 20. Since the rear axles 21, 22 and 23 are non-steering axles, a vector of the speed $v_T$ of the center of the rear axles 21, 22, 23 with respect to the point T remains directed in the longitudinal direction of the trailer 20. A distance L is the distance between the point T and the center of the king pin K in the longitudinal direction of the trailer 20.

Upon application of the steering angle on the front axle 11 of the towing vehicle 10, the trailer 20 represents a rotating rigid body rotating about point D as instantaneous center of velocity (ICV) of the trailer 20. A distance $r_T$ is the distance between point D and point T.

Figure 2:
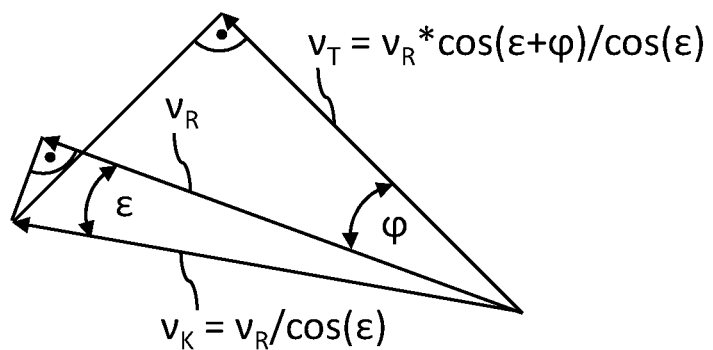
FIG. 2 is a diagram showing the geometric relationships between speed vectors and angles, respectively.

FIG. 2 is a diagram showing the geometric relationships between speed vectors $v_R$, $v_K$ and $v_T$ and angles $\varepsilon$ and $\varphi$.

As apparent from FIG. 2, the angle ε is the angle between the vector of the speed $v_K$ with respect to point K and the vector of the speed $v_R$ with respect to point R and can be expressed by:

$$\varepsilon = \tan^{-1}\left(\frac{c}{r}\right). \quad \text{(equation (4))}$$

Further, the speed $v_K$ with respect to the center of the king pin K can be calculated by:

$$v_K = v_R/\cos(\varepsilon) \quad \text{(equation (6))}.$$

Accordingly, the speed $v_T$ with respect to point T and the angle between $v_K$ and $v_T$ being ε+φ can be expressed by:

$$v_T = \quad \text{(equation (10))}$$
$$v_K \cos(\varepsilon + \varphi) = v_R \frac{\cos(\varepsilon + \varphi)}{\cos(\varepsilon)} = v_R \cos(\varepsilon + \varphi)/\cos(\varepsilon).$$

Figure 3:
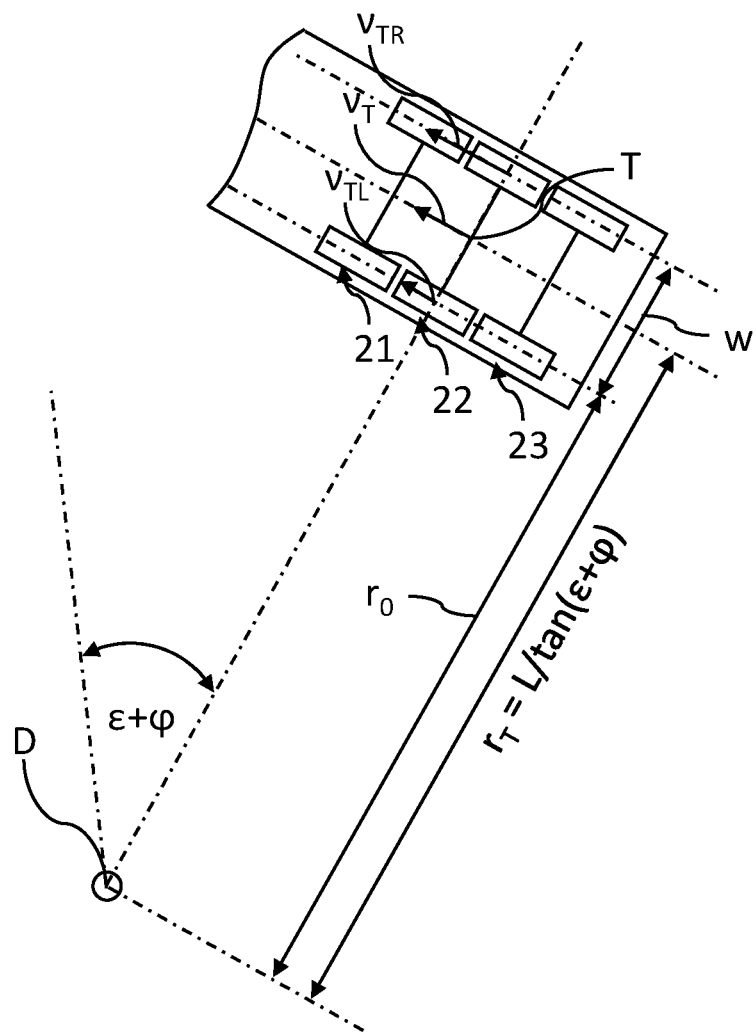
FIG. 3 is an enlarged view of a rear axle portion of the trailer and respective geometric ratios.

FIG. 3 shows an enlarged view of a rear axle portion of the trailer and respective geometric ratios. In concrete, the rear part of the trailer 20 comprising the rear axles 21, 22, 23 is shown.

Each of the rear axles 21, 22, 23 of the trailer 20 comprises a left wheel as wheel facing towards the instantaneous center of velocity D, and a right wheel as wheel facing away from the instantaneous center of velocity D. Even though the exemplary embodiment shows only one left and one right wheel per axle, each of the axles may provide more than one left and/or right wheel, which may be represented by one left or right wheel in FIG. 3.

A distance between point D as instantaneous center of velocity of the trailer 20 and each wheel of the rear axles 21, 22, 23 is proportional to the wheel speed of such wheels. For example, if the trailer 20 turns to the left, the following equation may be used:

$$\frac{v_{TL}}{r_0} = \frac{v_{TR}}{r_0 + w}, \quad \text{(equation (11))}$$

wherein $v_{TL}$ is the speed of the left wheel, $v_{TR}$ the speed of the right wheel, $r_0$ the distance between the point D as instantaneous center of velocity of the trailer 20 and the left wheel and w is the distance between the left and the right wheel.

Accordingly, the distance $r_0$ can by expressed by:

$$r_0 = w \cdot \frac{\min(v_{TL}, v_{TR})}{abs(v_{TL} - v_{TR})}, \quad \text{(equation (3))}$$

Further, the distance $r_T$ between point D as instantaneous center of velocity of the trailer 20 and point T can be expressed by:

$$r_T = r_0 + w/2 \quad \text{(equation (2))},$$

In accordance with the geometric relationships and speeds $v_F$, $v_R$, $v_K$ and $v_T$ or $v_{TL}$ and $v_{TR}$, respectively, representative of respective wheel speeds, the articulation angle φ between the respective longitudinal axes of the towing vehicle 10 and the trailer 20 with respect to the center of the king pin K as pivot can be estimated based on the geometric data and instantaneous wheel speeds. In the following, exemplary embodiments of respective methods are presented.

According to a first exemplary embodiment of the method for estimating the articulation angle φ, the method uses the geometric data of the towing vehicle 10, here the distance b between the front axle 11 and the rear axle 12, and the distance c between the rear axle 12 and the center of the king pin K, the instantaneous steering angle ϑ, the speed $v_R$ of the center of the rear axle 12 of the towing vehicle with respect to point R, and the speed $v_T$ of the center of the rear axles 21, 22, 23 of the trailer 20 with respect to point T as input data. In principle, the geometric data may be provided by a database to be selected according to the specific towing vehicle 10 and trailer 20 as preset and/or as constant preset. The steering angle may be provided in accordance with a control signal causing the steering and/or by respective sensor data. The speeds $v_R$ and $v_T$ may also be estimated in accordance with respective control signals with respect to a driving speed, acceleration or deceleration, and/or by a sensor signals, for example by direct measurements or indirect measurements representative of the speeds $v_R$ and/or $v_T$.

Based on the distance b between the front axle 11 and the rear axle 12 of the towing vehicle 10 and the instantaneous steering angle ϑ, the distance r between point P as instantaneous center of velocity of the towing vehicle 10 and the rear axle 12 of the towing vehicle 10 is calculated by equation (1), that is:

$$r = b/\tan(\vartheta) \quad \text{(equation (1))}.$$

Further, the angle ε between the vectors of the speed $v_R$ of the center of the rear axle 12 of the towing vehicle 10 and the speed $v_K$ of the center of the kingpin K is calculated by equation (4), that is:

$$\varepsilon = \tan^{-1}\left(\frac{c}{r}\right). \quad \text{(equation (4))}$$

According to the available data, the speed $v_K$ of the center of the king pin K is calculated by equation (6), that is:

$$v_K = v_R/\cos(\varepsilon) \quad \text{(equation (6))}.$$

However, the speed $v_K$ of the center of the king pin K may also be determined as input data in term of being available in accordance with a control signal or by sensor data as direct or indirect measurement. Nevertheless, the calculation may reduce the required amount of data to be provided as input data.

As the ratio between the speed $v_T$ of the center of the rear axles 21, 22, 23 of the trailer 20 and the speed $v_K$ of the center of the kingpin K can be expressed by:

$$\frac{v_T}{v_K} = \cos(\varepsilon + \varphi), \quad \text{(equation (5'))}$$

the articulation angle φ is estimated by equation (5), that is:

$$\varphi = \cos^{-1}\left(\frac{v_T}{v_K}\right) - \varepsilon, \quad \text{(equation (5))}$$

In summary, the articulation angle φ according to the first embodiment of the method for estimating the articulation angle φ is estimated based on the input data, i.e. the distance b between the front axle 11 and the rear axle 12, and the distance c between the rear axle 12 and the center of the king pin K, the instantaneous steering angle $\vartheta$, the speed $v_R$ of the center of the rear axle 12 of the towing vehicle with respect to point R, and the speed $v_T$ of the center of the rear axles 21, 22, 23 of the trailer 20 with respect to point T, and the respectively calculated variables, i.e. the distance r between point P as instantaneous center of velocity of the towing vehicle 10 and the rear axle 12 of the towing vehicle 10, the angle $\varepsilon$ between the vectors of the speed $v_R$ of the center of the rear axle 12 of the towing vehicle 10 and the speed $v_K$ of the center of the kingpin K, and the speed $v_K$ of the center of the king pin K.

Consequently, as a basic principle, the articulation angle $\varphi$ is estimated by using the wheel speed(s) of the towing vehicle 10 and the trailer 20 and steering angle as time varying signals. Specifically, the articulation angle $\varphi$ is estimated by using the wheel speed(s) of the non-steering axle of the towing vehicle 10 and/or the non-steering axle of the trailer 20 and steering angle as time varying signals. More specifically, the articulation angle $\varphi$ is estimated by using the geometric parameters of towing vehicle axle- and king pin bases.

According to a second exemplary embodiment of the method for estimating the articulation angle $\varphi$, the method uses the geometric data of the trailer 20, here the distance L between the point T and the center of the king pin K in the longitudinal direction of the trailer 20 and the distance w between the left and the right wheels of the rear axles 21, 22, 23 of the trailer 20, and the speed $v_{TL}$ of the left wheels of the rear axles 21, 22, 23 of the trailer 20 as well as the speed $v_{TR}$ of the right wheels of the rear axles 21, 22, 23 of the trailer 20 as input data.

Based on the distance w between the left and the right wheels of the rear axles 21, 22, 23 of the trailer 20 and the speed $v_{TL}$ of the left wheels of the rear axles 21, 22, 23 of the trailer 20 as well as the speed $v_{TR}$ of the right wheels of the rear axles 21, 22, 23 of the trailer 20, the distance $r_0$ between the point D as instantaneous center of velocity of the trailer 20 and the left wheel is calculated by equation (3), that is:

$$r_0 = w \cdot \frac{\min(v_{TL}, v_{TR})}{\mathrm{abs}(v_{TL} - v_{TR})}. \qquad \text{(equation (3))}$$

Further, the distance $r_T$ between point D as instantaneous center of velocity of the trailer 20 and point T is calculated by equation (2), that is:

$$r_T = r_0 + w/2 \qquad \text{(equation (2))}.$$

Since the sum of the angle $\varepsilon$ and articulation angle $\varphi$ can be expressed by:

$$\varepsilon + \varphi = \tan^{-1}\left(\frac{L}{r_T}\right), \qquad \text{(equation (8'))}$$

the articulation angle $\varphi$ can be expressed by equation (8), that is:

$$\varphi = \tan^{-1}\left(\frac{L}{r_T}\right) - \varepsilon. \qquad \text{(equation (8))}$$

According to the second exemplary embodiment of the method for estimating the articulation angle $\varphi$, the angle $\varepsilon$ is set to 0 as being neglected. Consequently, the articulation angle $\varphi$ is estimated by equation (9), that is:

$$\varphi = \tan^{-1}\left(\frac{L}{r_T}\right). \qquad \text{(equation (9))}$$

As per the above, the second exemplary embodiment of the method for estimating the articulation angle $\varphi$ does not require any data with respect to the towing vehicle 10.

In summary, the articulation angle $\varphi$ according to the second embodiment of the method for estimating the articulation angle $\varphi$ is estimated based on the input data of the trailer 20, i.e. the distance L between the point T and the center of the king pin K in the longitudinal direction of the trailer 20, and the distance w between the left and the right wheels of the rear axles 21, 22, 23 of the trailer 20, and the speed $v_{TL}$ of the left wheels of the rear axles 21, 22, 23 of the trailer 20 as well as the speed $v_{TR}$ of the right wheels of the rear axles 21, 22, 23 of the trailer 20, and the respectively calculated variables, i.e. the distance $r_0$ between the point D as instantaneous center of velocity of the trailer 20 and the left wheel, and the distance $r_T$ between point D as instantaneous center of velocity of the trailer 20 and point T.

Consequently, as a basic principle, the articulation angle $\varphi$ is estimated by using the wheel speed(s) of the trailer 20 as the only time varying signals. Specifically, the articulation angle $\varphi$ is estimated by using the wheel speed(s) of the non-steering axle of the trailer 20 as time varying signals. More specifically, the articulation angle $\varphi$ is estimated by using the wheel speed(s) of the trailer 20 on both sides on the same axle, preferably on the non-steering axles, as time varying signals. Preferably, the geometric input data may be restricted to the geometric data of the axle- and wheelbases of the trailer 20.

According to a third exemplary embodiment of the method for estimating the articulation angle $\varphi$, the method combines the first and second embodiment of the method for estimating the articulation angle $\varphi$. Accordingly, the input data comprises the geometric data of the towing vehicle 10, here the distance b between the front axle 11 and the rear axle 12, and the distance c between the rear axle 12 and the center of the king pin K, and the geometric data of the trailer 20, here the distance L between the point T and the center of the king pin K in the longitudinal direction of the trailer 20, and the distance w between the left and the right wheels of the rear axles 21, 22, 23 of the trailer 20. Further, the input data comprises the instantaneous steering angle $\vartheta$, the speed $v_R$ of the center of the rear axle 12 of the towing vehicle 10 with respect to point R, and the speed vim of the left wheels of the rear axles 21, 22, 23 of the trailer 20 as well as the speed $v_{TR}$ of the right wheels of the rear axles 21, 22, 23 of the trailer 20.

Based on the distance b between the front axle 11 and the rear axle 12 of the towing vehicle 10 and the instantaneous steering angle $\vartheta$, the distance r between point P as instantaneous center of velocity of the towing vehicle 10 and the rear axle 12 of the towing vehicle 10 is calculated by equation (1), that is:

$$r = b/\tan(\vartheta) \qquad \text{(equation (1))}.$$

Further, the angle $\varepsilon$ between the vectors of the speed $v_R$ of the center of the rear axle 12 of the towing vehicle 10 and the speed $v_K$ of the center of the kingpin K is calculated by equation (4), that is:

$$\varepsilon = \tan^{-1}\left(\frac{c}{r}\right). \qquad \text{(equation (4))}$$

Based on the distance w between the left and the right wheels of the rear axles 21, 22, 23 of the trailer 20, and the speed vim of the left wheels of the rear axles 21, 22, 23 of the trailer 20, as well as the speed $v_{TR}$ of the right wheels of the rear axles 21, 22, 23 of the trailer 20, the distance $r_0$ between the point D as instantaneous center of velocity of the trailer 20 and the left wheel is calculated by equation (3), that is:

$$r_0 = w \cdot \frac{\min(v_{TL}, v_{TR})}{\text{abs}(v_{TL} - v_{TR})}. \qquad \text{(equation (3))}$$

Further, the distance $r_T$ between point D as instantaneous center of velocity of the trailer 20 and point T is calculated by equation (2), that is:

$$r_T = r_0 + w/2 \qquad \text{(equation (2))}.$$

Since the sum of the angle $\varepsilon$ and articulation angle $\varphi$ can be expressed by:

$$\varepsilon + \varphi = \tan^{-1}\left(\frac{L}{r_T}\right), \qquad \text{(equation (8'))}$$

the articulation angle $\varphi$ is calculated by equation (8), that is:

$$\varphi = \tan^{-1}\left(\frac{L}{r_T}\right) - \varepsilon. \qquad \text{(equation (8))}$$

Consequently, as a basic principle, the articulation angle $\varphi$ is estimated by using the wheel speed(s) of the towing vehicle 10 and the trailer 20 and steering angle as time varying signals. Specifically, the articulation angle $\varphi$ is estimated by using the wheel speed(s) of the non-steering axle of the towing vehicle 10 and/or the non-steering axle of the trailer 20 and steering angle as time varying signals. More specifically, the articulation angle $\varphi$ is estimated by using the geometric parameters of towing vehicle axle- and king pin bases. More specifically, the articulation angle $\varphi$ is estimated by using the wheel speed(s) of the trailer 20 on both sides on the same axle, preferably on the non-steering axles, as time varying signals. Preferably, the geometric input data refers to the trailer geometric parameters of the towing vehicle axle- and kingpin bases plus the trailer axle- and wheelbases.

Figure 4:
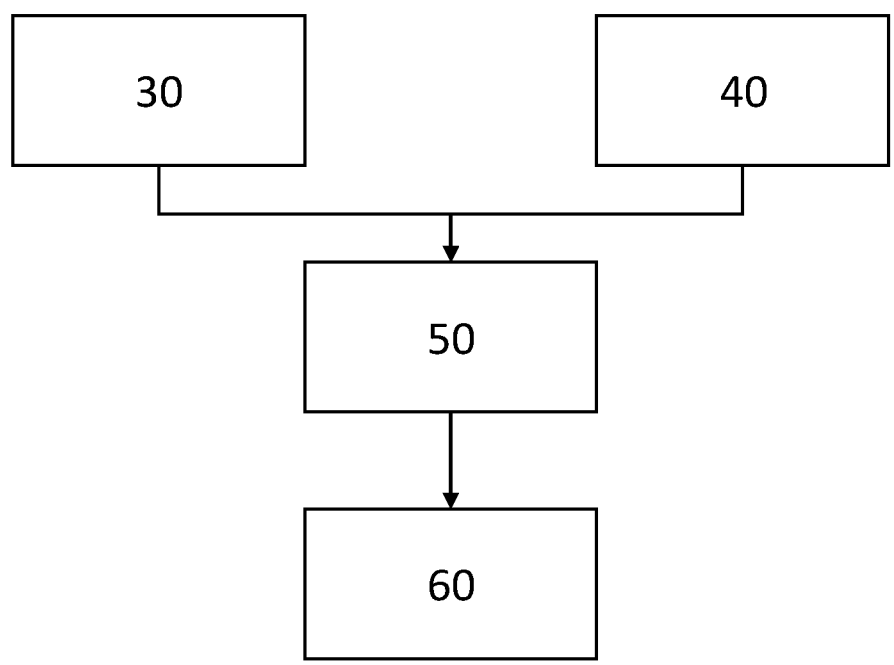
FIG. 4 is a schematic representation of a device for estimating an articulation angle between the towing vehicle and the trailer with respect to the pivot.

FIG. 4 shows a schematic representation of a device for estimating an articulation angle $\varphi$ between the towing vehicle 10 and the trailer 20 with respect to the center of the king pin K as pivot.

The device comprises:
a data unit 30 configured to receive and/or store data of:
the distance b between a steering axle, preferably the front axle 11, of the towing vehicle 10 and a non-steering axle, preferably the rear axle 12, of the towing vehicle 10,
the distance c between the non-steering axle of the towing vehicle 10 and the center of the king pin K as pivot,
the distance L between the at least one axle 21, 22, 23 of the trailer 20 and the center of the king pin K as pivot, and/or
the distance w between the center of the at least one wheel on the at least one axle 21, 22, 23 of the trailer 20 facing towards the instantaneous center of velocity D of the trailer 20 and at least one wheel on the other side of the at least one axle 21, 22, 23 of the trailer 20,
a determination unit 40 configured to determine:
the steering angle of the steering axle,
the speed $v_R$ of the center of at least one axle represented by point R of the towing vehicle 10,
the speed $v_T$ of the center of at least one axle represented by point T of the trailer 20, and/or
the speed $v_{TL}$ and/or $v_{TR}$ of at least one wheel of at least one rear axle 21, 22, 23 of the trailer 20, preferably the speeds $v_{TL}$ and $v_{TR}$ of opposing wheels of the at least one axle 21, 22, 23 with respect to the center of the at least one axle represented by point T,
an estimation unit 50 configured to determine:
the distance r between the instantaneous center of velocity P of the towing vehicle 10 and the center of at least one axle R the towing vehicle 10 representative for a rotation of the towing vehicle 10 about the instantaneous center of velocity P of the towing vehicle 10,
the distance $r_T$ between the instantaneous center of velocity D of the trailer 20 and the center of at least one axle represented by point T of the trailer 20 representative for a rotation of the trailer 20 about the instantaneous center of velocity D of the trailer 20,
the speed $v_K$ of the center of the king pin K as pivot,
the angle $\varepsilon$ of the velocity vector $v_K$ of the king pin K as pivot and the velocity vector w of the at least one axle 12 of the towing vehicle 10, and/or
the ratio between the speeds $v_T$ and $v_K$ of the center of the at least one rear axle represented by point T of the trailer 20 and the center of the king pin K as pivot,
to estimate the articulation angle $\varphi$; and
an output unit 60 configured to output the articulation angle $\varphi$.

The device may be configured to execute any of the previously described methods for estimating an articulation angle $\varphi$ between the towing vehicle 10 and the trailer 20 with respect to the pivot according to the first to second embodiment. However, the device may be alternatively configured to provide only one or two of such methods or any other applicable method in accordance with the invention. Accordingly, the respective device is configured to determine and calculate data at least required for such execution.

The invention has been described with respect to exemplary embodiments. However, the invention is not limited to the exemplary embodiments.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGN

10 towing vehicle
11 front axle (towing vehicle)
12 rear axle (towing vehicle)
20 trailer 21 first rear axle (trailer)
22 second rear axle (trailer)
23 third rear axle (trailer)
30 data unit
40 determination unit
50 calculation unit (estimation unit)
60 output unit
b distance between front and rear axle (towing vehicle)
c distance between rear axle and king pin (towing vehicle)
D instantaneous center of velocity (ICV) point (trailer)
F center of front axle (towing vehicle)
K center of king pin (pivot)
L distance between K (king pin (pivot)) and T (center of rear axle(s) of trailer)
P instantaneous center of velocity (ICV) point (towing vehicle)
r distance between P (ICV point of towing vehicle) and R (center of rear axle of towing vehicle)
$r_T$ distance between D (ICV point of trailer) and T (center of rear axle(s) of trailer)
$r_0$ distance between D (ICV point of trailer) and facing wheel(s) of rear axle(s) (trailer)
R center of rear axle (towing vehicle)
T center of rear axle(s) (trailer)
w distance between wheels on opposite sides of the rear axle(s) (trailer)
ε angle between velocity vectors $v_K$ and $v_R$
ϑ steering angle
$v_F$ speed of center of front axle (towing vehicle)
$v_K$ speed of center of king pin (pivot)
$v_R$ speed of center of rear axle (towing vehicle)
$v_T$ speed of center of rear axle(s) (trailer)
$v_{TL}$ speed of left wheel(s) of rear axle(s) (trailer; facing towards D)
$v_{TR}$ speed of right wheel(s) of rear axle(s) (trailer; facing away from D)
φ articulation angle

What is claimed is:

1. A method for estimating an articulation angle (φ) between a towing vehicle and a trailer with respect to a pivot (K), comprising:
   determining a distance (r) between an instantaneous center of velocity (P) of the towing vehicle and a center of at least one axle (R) of the towing vehicle representative for a rotation of the towing vehicle about the instantaneous center of velocity (P) of the towing vehicle and/or a distance ($r_T$) between an instantaneous center of velocity (D) of the trailer and a center of at least one axle (T) of the trailer representative for a rotation of the trailer about the instantaneous center of velocity (D) of the trailer;
   determining at least one instantaneous speed ($v_R$, $v_T$, $v_{TL}$, $v_{TR}$) representative for a wheel speed of at least one wheel of the towing vehicle and/or the trailer, wherein the at least one instantaneous speed ($v_R$, $v_T$, $v_{TL}$, $v_{TR}$) refers to the at least one determined distance (r, $r_T$); and
   estimating the articulation angle (φ) based on the at least one determined instantaneous speed and the at least one determined distance (r, $r_T$), wherein
   the distance (r) between the instantaneous center of velocity (P) of the towing vehicle and the center of at least one axle (R) of the towing vehicle is calculated, based on a distance (b) between a steering axle of the towing vehicle and a non-steering axle of the towing vehicle, and a steering angle (ϑ) of the steering axle.

2. The method according to claim 1, wherein the at least one instantaneous speed ($v_R$, $v_T$, $v_{TL}$, $v_{TR}$) is determined for:
   at least one non-steered axle of the towing vehicle, as speed ($v_R$) of the center of at least one rear axle (R) of the towing vehicle, and/or
   at least one non-steered axle of the trailer, as speed ($v_T$) of the center of at least one rear axle (T) or as speed ($v_{TL}$, $v_{TR}$) of at least one wheel of at least one rear axle of the trailer.

3. The method according to claim 1, wherein
   the distance (r) between the instantaneous center of velocity (P) of the towing vehicle and the center of at least one axle (R) the towing vehicle is calculated by:

$$r = b/\tan(\vartheta).$$

4. The method according to claim 1, wherein
   the distance ($r_T$) between the instantaneous center of velocity (D) of the trailer and the center of at least one axle (T) of the trailer is calculated based on a distance ($r_0$) between a center of at least one wheel on the at least one axle of the trailer facing towards the instantaneous center of velocity of the trailer and a distance (w) between the center of the at least one wheel on the at least one axle facing towards the instantaneous center of velocity (D) of the trailer and at least one wheel on the other side of the at least one axle.

5. The method according to claim 4, wherein
   the distance ($r_T$) between the instantaneous center of velocity (D) of the trailer and the center of at least one axle (T) of the trailer is calculated by:

$$r_T = r_0 + w/2,$$

wherein $r_0$ is defined by $$r_0 = w \cdot \frac{\min(v_{TL}, v_{TR})}{\mathrm{abs}(v_{TL} - v_{TR})}.$$

wherein $v_{TL}$ is the speed of wheel(s) of the at least one axle facing towards the instantaneous center of velocity (D) of the trailer and $v_{TR}$ is the speed of wheel(s) of at least one axle facing away from the instantaneous center of velocity (D) of the trailer.

6. The method according to claim 1, wherein the method further comprises:
   determining an angle (ε) of a velocity vector ($v_K$) of the pivot (K) and the velocity vector ($v_R$) of the at least one axle (12) of the towing vehicle (10), calculated by:

$$\varepsilon = \tan^{-1}\left(\frac{c}{r}\right).$$

wherein c is defined as distance between the center of at least one axle (R) of the towing vehicle and the pivot (K).

7. The method according to claim 6, wherein the articulation angle (φ) is estimated by:

$$\varphi = \cos^{-1}\left(\frac{v_T}{v_K}\right) - \varepsilon,$$

wherein $v_T$ is defined as speed of the center of at least one axle (T) of the trailer, $v_K$ is defined as speed of the center of the pivot (K), calculated by:

$$v_K = v_R/\cos(\varepsilon),$$

and the ratio between the speeds ($v_T$, $v_K$) of the center of the at least one rear axle (T) of the trailer and the center of the pivot (K) is expressed by:

$$\frac{v_T}{v_K} = \cos(\varepsilon + \varphi).$$

8. The method according to claim 6, wherein the articulation angle ($\varphi$) is estimated by:

$$\varphi = \tan^{-1}\left(\frac{L}{r_T}\right) - \varepsilon,$$

wherein L is defined as distance between the at least one axle of the trailer and the pivot (K).

9. The method according to claim 1, wherein the articulation angle ($\varphi$) is estimated by:

$$\varphi = \tan^{-1}\left(\frac{L}{r_T}\right),$$

wherein L is defined as distance between the at least one axle of the trailer and the pivot (K).

10. A device for estimating an articulation angle ($\varphi$) between a towing vehicle and a trailer with respect to a pivot, comprising:
  (a) a data unit configured to receive and/or store data of:
    (i) a distance (b) between a steering axle of the towing vehicle and a non-steering axle of the towing vehicle,
    (ii) a distance (c) between the non-steering axle of the towing vehicle and the pivot,
    (iii) the distance (L) between the at least one axle of the trailer and the pivot (K), and/or
    (iv) the distance (w) between the center of the at least one wheel on the at least one axle facing towards an instantaneous center of velocity of the trailer and at least one wheel on the other side of the at least one axle;
  (b) a determination unit configured to determine:
    (i) the steering angle ($\upsilon$) of the steering axle,
    (ii) the speed ($v_R$) of the center of at least one axle (R) of the towing vehicle,
    (iii) the speed ($v_T$) of the center of at least one axle (T) of the trailer, and/or
    (iv) the speed ($v_{TL}$, $v_{TR}$) of at least one wheel of at least one rear axle of the trailer, with respect to the center of the at least one axle (T);
  (c) an estimation unit configured to determine:
    (i) the distance (r) between the instantaneous center of velocity (P) of the towing vehicle and the center of at least one axle (R) the towing vehicle representative for a rotation of the towing vehicle about the instantaneous center of velocity (P) of the towing vehicle,
    (ii) the distance ($r_T$) between the instantaneous center of velocity (D) of the trailer and the center of at least one axle (T) of the trailer representative for a rotation of the trailer about the instantaneous center of velocity (D) of the trailer,
    (iii) the speed ($v_K$) of the center of the pivot (K),
    (iv) the angle ($\varepsilon$) of the velocity vector ($v_K$) of the pivot (K) and the velocity vector ($v_R$) of the at least one axle of the towing vehicle, and/or
    (v) the ratio between the speeds ($v_T$, $v_K$) of the center of the at least one rear axle (T) of the trailer and the center of the pivot, in order to estimate the articulation angle ($\varphi$); and
  (d) an output unit configured to output the articulation angle ($\varphi$), wherein
  the distance (r) between the instantaneous center of velocity (P) of the towing vehicle and the center of at least one axle (R) of the towing vehicle is calculated, based on a distance (b) between a steering axle of the towing vehicle and a non-steering axle of the towing vehicle, and a steering angle ($\vartheta$) of the steering axle.

11. The device according to claim 10, wherein the speed of at least one wheel of at least one rear axle are the speeds ($v_{TL}$, $v_{TR}$) of opposing wheels of the at least one axle.

12. The device according to claim 10, wherein the estimation unit comprises a calculation unit to calculate at least one of:
  (i) the distance (r) between the instantaneous center of velocity (P) of the towing vehicle and the center of at least one axle (R) the towing vehicle representative for a rotation of the towing vehicle about the instantaneous center of velocity (P) of the towing vehicle,
  (ii) the distance (r) between the instantaneous center of velocity (D) of the trailer and the center of at least one axle (T) of the trailer representative for a rotation of the trailer about the instantaneous center of velocity (D) of the trailer,
  (iii) the speed ($v_K$) of the center of the pivot (K),
  (iv) the angle ($\varepsilon$) of the velocity vector ($v_K$) of the pivot (K) and the velocity vector ($v_R$) of the at least one axle of the towing vehicle, or
  (v) the ratio between the speeds ($v_T$, $v_K$) of the center of the at least one rear axle (T) of the trailer and the center of the pivot.

13. A driving assistance system for a towing vehicle, comprising:
  the device for estimating an articulation angle between the towing vehicle and a trailer with respect to a pivot according to claim 10.

14. A commercial vehicle comprising the driving assistance system according to claim 13.

15. A computer product comprising a non-transitory computer readable medium having stored thereon program code which, when executed by one or more processors, carries out the acts of:
  determining a distance (r) between an instantaneous center of velocity (P) of the towing vehicle and a center of at least one axle (R) of the towing vehicle representative for a rotation of the towing vehicle about the instantaneous center of velocity (P) of the towing vehicle and/or a distance ($r_T$) between an instantaneous center of velocity (D) of the trailer and a center of at least one axle (T) of the trailer representative for a rotation of the trailer about the instantaneous center of velocity (D) of the trailer;
  determining at least one instantaneous speed ($v_R$, $v_T$, $v_{TL}$, $v_{TR}$) representative for a wheel speed of at least one wheel of the towing vehicle and/or the trailer, wherein the at least one instantaneous speed ($v_R$, $v_T$, $v_{TL}$, $v_{TR}$) refers to the at least one determined distance (r, $r_T$); and
  estimating the articulation angle ($\varphi$) based on the at least one determined instantaneous speed and the at least one determined distance (r, $r_T$), wherein
  the distance (r) between the instantaneous center of velocity (P) of the towing vehicle and the center of at least one axle (R) of the towing vehicle is calculated, based on a distance (b) between a steering axle of the towing vehicle and a non-steering axle of the towing vehicle, and a steering angle ($\vartheta$) of the steering axle.

* * * * *